United States Patent [19]

Cowett, Jr.

[11] 4,190,883

[45] Feb. 26, 1980

[54] SWITCHING-REGULATED DC-TO-DC CONVERTER

[75] Inventor: Philip M. Cowett, Jr., Olney, Md.

[73] Assignee: The United States of America as represented by the Secretary of the Army, Washington, D.C.

[21] Appl. No.: 827,281

[22] Filed: Aug. 24, 1977

[51] Int. Cl.$^2$ ............................................. H02M 3/335
[52] U.S. Cl. ...................................... 363/26; 363/97; 363/134
[58] Field of Search .................................. 363/24–26, 363/41, 97, 134

[56] References Cited

U.S. PATENT DOCUMENTS

| | | | |
|---|---|---|---|
| 3,859,583 | 1/1975 | Reed | 363/26 |
| 3,921,005 | 11/1975 | Watrous | 363/25 X |
| 3,925,715 | 12/1975 | Venable | 363/26 |
| 4,005,352 | 1/1977 | Kugler et al. | 363/26 |
| 4,025,863 | 5/1977 | Higuchi et al. | 363/25 |

Primary Examiner—William M. Shoop
Attorney, Agent, or Firm—Nathan Edelberg; Robert P. Gibson; Saul Elbaum

[57] ABSTRACT

A pulse width modulated DC-to-DC converter circuit is disclosed having a novel means for permitting each of the switching transistor duty cycles to exceed 50% without the occurrence of current spikes at the input winding of the output transformer. These current spikes result when both switching transistors are on when each of the transistors switch operating states at an instantaneous point in time. As a result, a wide range of input power source voltages can be utilized for a given output voltage thereby resulting in a wide range of voltage regulation. This result is achieved by utilization of an energy storage choke between the battery means and the input winding of the output transformer. Whenever there exists an instantaneous current spike, the choke absorbs the spike.

8 Claims, 4 Drawing Figures

SWITCHING-REGULATED DC-TO-DC CONVERTER

FIELD OF THE INVENTION

This invention relates to DC-to-DC converter circuits and more particularly to such circuits which are switching regulated.

BACKGROUND OF THE INVENTION

In the design of switching-regulated DC-to-DC converters, choke input filters are required for all outputs. In the case where high voltage outputs are required, large values of choke are required and this poses a design problem in such circuits.

One previous way of providing the required choke was to place such choke input filters between the output transformer and full wave rectifier of such a converter and the output terminal.

The output voltage of the converter is then fed back with a reference voltage through an error amplifier and a regulator loop filter to the control terminal of a pulse-width modulated driver circuit which controls first and second switching transistors which together drive an output transformer by means of an input power source such as a battery. This known type of DC-to-DC converter has a switching transistor duty cycle of from 0 to 50%, i.e., the switching transistors are alternately actuated and no overlap or simultaneous conduction of the switching transistors is utilized.

It is an object of the present invention to provide a switching-regulated DC-to-DC converter circuit in which the switching transistor duty cycle can exceed 50%.

Still another object of the present invention is to provide a new and novel switching-regulated DC-to-DC converter circuit having an input choke interconnected with the input power source, switching transistors and the output transformer, on the input side of the output transformer, and not requiring choke-input filters on each of the outputs.

Yet another object of the present invention is to provide a new and novel switching-regulated DC-to-DC converter circuit having an enhanced range of regulation.

These and other objects of the present invention will become more fully apparent with reference to the following specification and drawings which relate to a preferred embodiment of the invention.

SUMMARY OF THE INVENTION

The DC-to-DC switching-regulated converter of the present invention comprises a pulse-width modulated driver circuit driving first and second switching transistors having a common connection to one side of an input power source such as a battery and each having an output dirving an output transformer having a center tap to which is connected a tapped choke coil. The tap of the choke coil is connected to the other side of the input battery and the input battery is shunted by one side of the tapped choke coil in series with a commutating diode.

The output of the output transformer drives a full-wave rectifier circuit which in turn drives a capacitor input-type filter which in turn is connected to the output voltage terminal which is also connected to one side of the input of an error amplifier to which a reference voltage is also applied. The output of the error amplifier drives a regulator loop filter which in turn controls the operation of the pulse-width modulated driver circuit to control the duty cycle and the on-off times of the switching transistors.

The DC-to-DC converter of the present invention operates through the 50% duty cycle point, that is to say, there are periods of overlap between the switching transistors when both of said switching transistors are on and as a result, a wide range of voltage regulation is possible such that a wide range of input power source voltages can be utilized to provide a given output voltage.

DETAILED DESCRIPTION OF THE DRAWINGS

Figure 1:
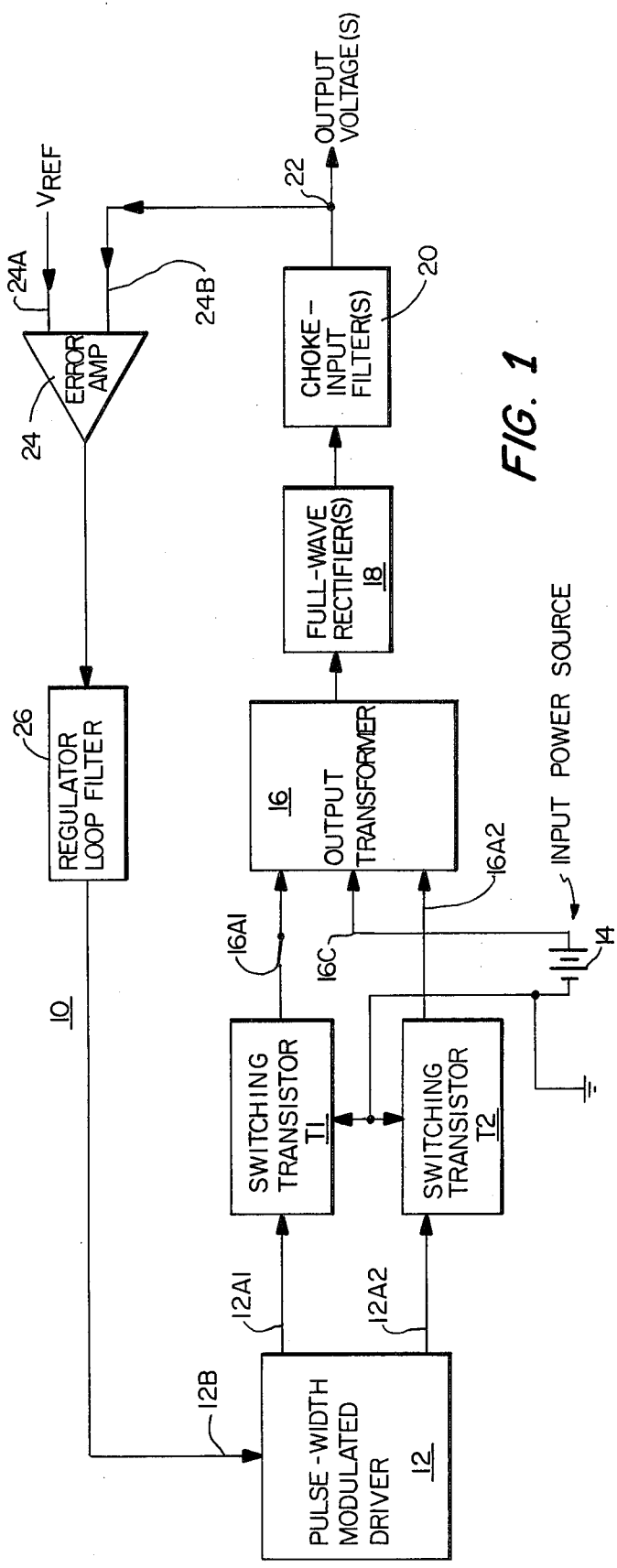
FIG. 1 is a schematic block diagram of a prior art type of DC-to-DC converter circuit.

The prior art form of regulated DC-to-DC converter is shown in FIG. 1 as a DC-to-DC converter circuit 10 having a pulse-width modulated driver circuit 12 with output terminals 12A1 and 12A2 thereof driving switching transistor means T1 and T2 respectively.

The switching transistor means T1 and T2 are biased in common from the grounded negative terminal of an input battery 14 or other suitable power source, with the other side of the power source being connected to a center tap or central terminal 16C of an output transformer circuit 16.

The switching transistors T1 and T2 respectively drive first and second input terminals 16A1 and 16A2 on opposite sides of the output transformer means 16.

A full-wave rectifier 18 is driven by the output of the output transformer 16 and in turn drives a choke input filter 20 having its output comprising the output voltage terminal 22 of the regulated DC-to-DC converter 10.

A reference voltage $V_{REF}$ is applied to a first input terminal 24A of an error amplifier 24 and the output voltage terminal 22 is connected to a second input terminal 24B of the error amplifier 24 such that the reference voltage and the output voltage appearing at the terminal 22 provide an error signal from the output of the error amplifier 24 which in turn drives a regulator loop filter 26, the latter being connected at its output to a control terminal 12B on the pulse-width modulator driver circuit 12 to thereby control the duty cycle of the switching transistors T1 and T2 through the driver circuit 12.

The preferred embodiment of the present invention will now be described with reference to FIG. 2 in which the preferred embodiment 100 of the said converter circuit is illustrated.

The converter circuit includes a pulse width modulated driver circuit 112 having output terminals 112A1 and 112A2 driving switching transistors ST1 and ST2 respectively, the latter having a common ground connection which is also connected to the negative side of an input power source or battery 114.

The switching transistors ST1 and ST2 drive input terminals 116A1 and 116A2 respectively of an output transformer circuit 116, the latter having a center terminal 116C which is connected to one end L1 of a choke coil L and thence through one side N1 of the choke coil L to a central tap L2 thereof which is commonly connected with the positive or opposite side of the input power source 114. The second or remaining side N2 of the choke coil L is connected by the other end terminal L3 of the latter through the reverse direction of a commutating diode D back to the negative side of the input source 114.

The output of the output transformer 116 drives a full-wave rectifier circuit 118 which in turn drives a capacitor input filter 120, the latter having its output terminal 122 comprising the output voltage terminal of the converter circuit 100.

A reference voltage $V_{REF}$ is applied to a first input terminal 124A of an error amplifier 124, the latter having a second input terminal 124B driven by the output voltage at the output voltage terminal 122 to thereby generate an error signal in the error amplifier 124 representative of the difference, if any, between the reference voltage and actual voltage appearing at the output terminal 122. The error amplifier 124 drives a regulator loop filter 126 which in turn drives a control terminal 112B of the pulse-width modulated driver circuit 112 to complete the circuit connections of the DC-to-DC regulated converter circuit 100.

Thus, it can be seen that the circuit 100 is similar to the prior art style circuit 10 with the exception of the addition of the commutating diode D, the tapped choke coil L and the substitution of capacitor-input filters 120 for the choke filters 20 in the output of the converter circuits. In the prior art circuit 10 during switching dead time, i.e. both transistors simultaneously off, there is no output from the output transformer 16 and therefore, no input to the choke-input filter 20. When one of the transistors T1, T2 is conducting, the input to the choke input filter 20 is a maximum determined by the turns ratio of the output transformer 16, the input voltage of the battery or input power source 14, and various other factors. The output of the choke input filters 20 is the average of the dead time and live time voltages. The voltage during dead time with neither transistor conducting is zero. Maximum voltage occurs during live time with one transistor conducting. This average voltage and as a result, the converter output voltage apearing at the converter terminal 22, varies as the precent of dead-time to live-time varies. Thus, controlling this duty cycle by means of the pulse width modulation means 12 will correspondingly vary the output voltage for any given input voltage supplied by the input power source 14. Thus, the reference voltage $V_{REF}$, the error amplifier 24 and the regulator loop filter serve as a regulator loop to vary the percent of dead-time to live-time achieved in the switching transistors T1, T2 to thereby control the ultimate output voltage of the converter circuit 10.

Figure 4:
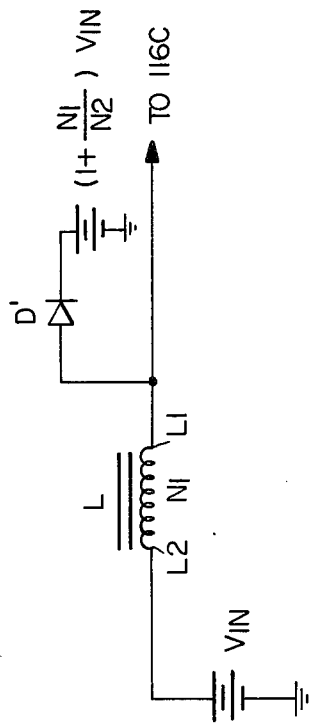
FIG. 4 is an equivalent circuit schematic of FIG. 3 illustrating the operation of the present invention.
Figure 3:
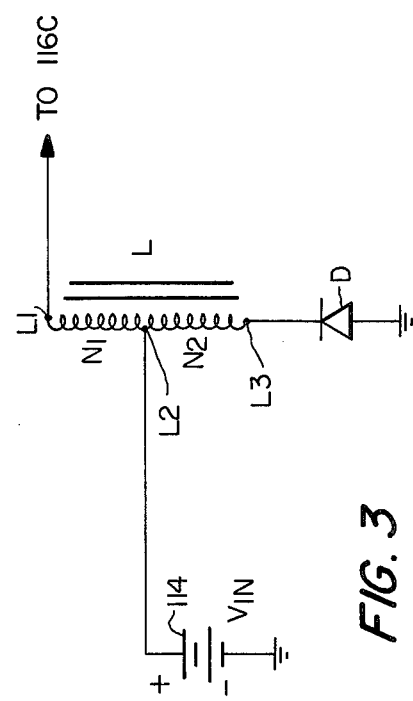
FIG. 3 is a circuit schematic illustrating part of the operation of the present invention.
Figure 2:
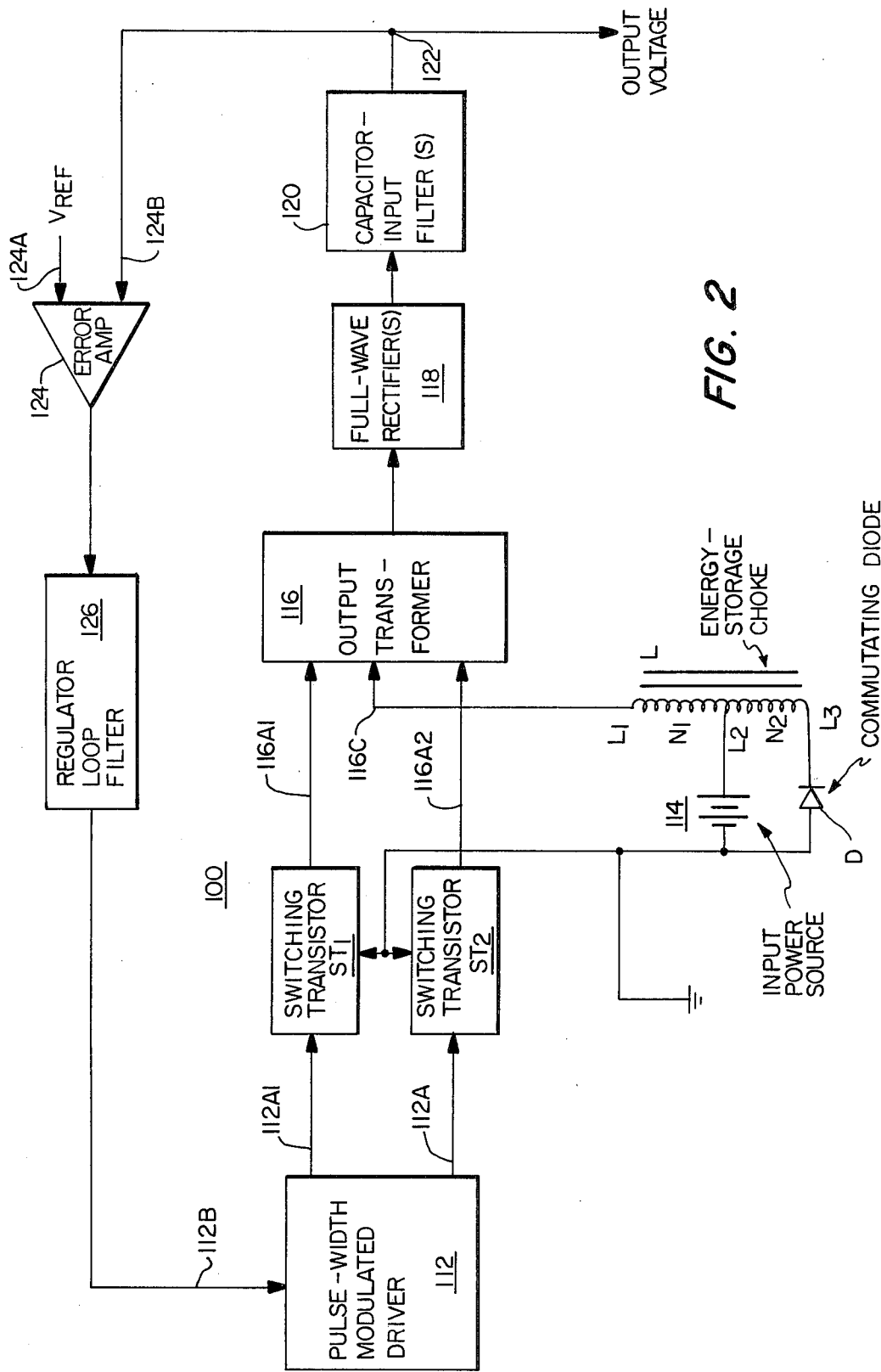
FIG. 2 is a schematic block diagram of the preferred embodiment of a DC-to-DC converter circuit on the present invention.

Referring now to FIGS. 2, 3 and 4, the operation of the regulated DC-to-DC converter circuit 100 will now be described:

Assuming that neither of the output transistors ST1 and ST2 are operating at more than 50% duty cycle, and therefore, that there is no time when both transistors are conducting simultaneously, the effective converter input voltage at the terminal L1 of the choke coil L will be less than the input voltage supplied by the battery 14 to the tap L2 on the choke coil L during individual live-time of either transistor ST1 or ST2.

During dead-time, no current is being drawn by either of the switching transistors ST1 or ST2 and hence no current flows out of the terminal L1 of the choke coil into the output transformer terminal 116C. Current flowing prior to the occurrence of dead-time during live-time, because of the characteristics of the choke coil L, wants to continue the flow therein and the voltage at the terminal L1 of the choke coil builds up to a value greater than the input voltage supplied by the battery 14.

When the voltage at the terminal L1 is increasing, the voltage at the terminal L3 is decreasing until the voltage between the terminals L2 and L3 is equal to the voltage at the battery 114 and the commutating diode D begins to conduct. The current which has formerly flowed through the terminal L2 to the terminal L1 of the energy storage choke L into the terminal 116C of the output transformer 116 now becomes transformed by the ratio N1/N2 (i.e., the ratio of the turns in the inductor section N1 to the number of turns in the section N2 which are on opposite sides of the intermediate tap L2) and flows through the commutating diode D. During the live-time of the converter, current flows out of the input power source or battery 114 and into the converter 100. During converter dead time, current flows through the energy storage choke L, through the commutating diode D and into the battery or input power source 114.

During converter live-time, the instantaneous input voltage to the converter output transformer 116 is less than the battery voltage, as previously described. This is the voltage which is steped up by the transformer 116 (or stepped down as the case may be) and thus, the converter output voltages are proportional to this instantaneous input voltage.

The equivalent circuit for the aforedescribed conditions are illustrated in FIGS. 3 and 4 to which reference is now made.

During dead-time, the voltage at the terminal L1 of the choke coil is $(1+N1/N2) V_{IN}$. The average voltage across the choke coil L must be zero, so that during live-time, the voltage at terminal pin L1 of the choke coil L must be less than $V_{IN}$. The following equation must be satisfied (assuming infinite inductance):

(Voltage across L during dead-time) (Percent dead-time)=(Voltage across L during live-time) (Percent live-time), or $(N1/N2) V_{IN}$(Percent dead time)$=(V_{IN}-V_X)$ (Percent live time)
where $V_X$=voltage at pin L1 during live time.

Letting $D_T$=converter total duty cycle (twice the duty cycle of either transistor) the equation becomes:

$(N1/N2) V_{IN} (1-D_T)=(V_{IN}-V_X) (D_T)$
and thus, $V_X=V_{IN}-(V_{IN}N_1 (1-D_T)/N_2D_T)$ Therefore, $V_X=V_{IN}(1+N_1/N_2-N_1/N_2D_T)$
Then, if N1 is equal to N2, $V_X=2V_{IN}-V_{IN}/D_T$
Therefore, the voltage $V_X$ is inversely proportional to duty cycle. As can be seen from this equation, a 50% duty cycle gives zero $V_X$ and hence zero converter output while a 100% duty cycle gives a $V_X$ equal to the input voltage $V_{IN}$ for a 1 to 1 turns ratio of the tapped choke coil L. Thus, it is clear that varying the duty cycle of the switching transistors will vary the converter output voltage.

The above discussion assumes that there is no time when both transistors are on simultaneously. If this should occur, then pin L1 of the choke coil L will be effectively shorted to ground during this time. When only one transistor is conducting, the voltage at pin L1 will be greater than the input voltage $V_{IN}$. Thus, a different mode of regulation will occur if transistor overlap is allowed to occur. During this transistor overlap mode of operation, the commutating diode D will not conduct and thus in some circuits, may be omitted along with the winding between the terminals L2 and L3 on a choke coil L (e.g. the inductor section N2). If d represents the duty cycle of either switching transistor, i.e., $d \equiv D_T/2$, then, when both transistors are conducting simultaneously, $V_X=0$.

When only one transistor is conducting, $V_X > V_{IN}$. The time when both transistors are conducting simultaneously is $2d-1$ while the time when only one transistor is conducting is $2-2d$. Obviously then $0.5 < d < 1.0$ for this condition to occur.

The equation for $V_X$ is derived as follows:

$$(V_{IN}-0)(2d-1)=(V_X-V_{IN})(2-2d)$$

$$V_X=V_{IN}(1+2d-1/2-2d)=V_{IN}(1+\text{overlap time/live time})$$

Therefore, at zero overlap time and 100% live-time (time when one and only one transistor is conducting) $V_X=V_{IN}$. As overlap time approaches 100% and live-time approaches zero, $V_X$ and hence the converter output voltage appearing at the terminal 22 approach infinity. The presence of the commutating diode D and its associated winding N2 on the choke coil L will limit $V_X$ to $(1+N1/N2)V_N$. However, it can be seen from these two equations that for $d<50\%$ and $d>50\%$, there is no discontinuity in the curve of d vs $V_X$. Therefore, a regulator which will operate through the point of $d=50\%$ to give an extremely wide range of input voltage for regulation has been achieved.

It should be understood that the switching-regulated DC-to-DC converter circuit of the present invention may be modified as would occur to one of ordinary skill in the art without departing from the spirit and scope of the present invention.

It is claimed:

1. In a switching regulated DC-to-Dc converter circuit including pulse-width modulated driver circuit means and first and second switching means driving opposite sides of an input winding of an output transformer, said input winding having a center tap and said switching means being duty cycle modulated by said driver circuit means to reverse the voltage applied to the said input winding and having a common terminal therebetween, said switching regulated DC-to-DC converter circuit further comprising:

a choke coil connected from said common terminal of said switching means to said center tap of said transformer input winding; and a source of direct current input voltage connected in series with one portion of said choke coil from said common terminal to said center tap, said source of direct current dividing said choke coil into two portions including said one portion and a second portion, said one portion of said choke coil having $N_1$ turns, said second portion having $N_2$ turns thereby defining a turns ratio equal to $N_1/N_2$ associated with said choke coil, said turns ratio of said choke coil being so selected as to permit said duty cycles of each of said respective switching means to exceed 50% without the occurrence of a current spike at said input winding of said output transformer thereby resulting in a wide range of voltage regulation by utilization of a wide range of input power source voltages for a given output voltage.

2. The combination of claim 1, which further comprises :

an intermediate tap on said choke coil;

said source being connected directly from said common terminal to said intermediate tap; and a commutating diode connected from said common terminal said center tap through the entire said choke coil.

3. The invention defined in claim 2, wherein the duty cycle of said switching means is selectively varied from less than 50% to greater than 50%.

4. The invention defined in claim 1, wherein the duty cycle of said switching means is selectively varied from 50% to greater than 50%.

5. The combination of claim 1, which further comprises:

full wave rectifier means driven by said output transformer to provide a voltage output;

capacitor filter means receiving and filtering the output of said rectifier means to provide the regulated output voltage of said converter means; and feedback means including error signal generating means comparing said regulated output voltage with a reference voltage and connected with said pulse width modulated driver circuit means to vary the duty cycle of said switching means in correlation to variations in said regulated output voltage.

6. The combination of claim 5, wherein the duty cycle of said switching means is selectively varied from 50% to greater than 50%.

7. The combination of claim 5, which further comprises:

an intermediate tap on said choke coil;

said source being connected directly from said common terminal to said intermediate tap; and a commutating diode connected from said common terminal said center tap through the entire said choke coil.

8. The combination of claim 7, wherein the duty cycle of said switching means is selectively varied from less than 50% to greater than 50%.

* * * * *